United States Patent
Altintas et al.

(10) Patent No.: US 10,159,036 B1
(45) Date of Patent: Dec. 18, 2018

(54) GATEWAY SELECTION FOR A VIRTUAL PARKED VEHICLE NETWORK

(71) Applicant: TOYOTA JIDOSHA KABUSHIKI KAISHA, Toyota-shi, Aichi-ken (JP)

(72) Inventors: Onur Altintas, Mountain View, CA (US); Takamasa Higuchi, Mountain View, CA (US); Falko Dressler, Mountain View, CA (US)

( * ) Notice: Subject to any disclaimer, the term of this patent is extended or adjusted under 35 U.S.C. 154(b) by 49 days.

(21) Appl. No.: 15/624,045

(22) Filed: Jun. 15, 2017

(51) Int. Cl.
| | | |
|---|---|---|
| *H04W 48/00* | (2009.01) | |
| *H04W 4/04* | (2009.01) | |
| *H04W 88/16* | (2009.01) | |
| *H04W 48/14* | (2009.01) | |

(52) U.S. Cl.
CPC .......... *H04W 48/17* (2013.01); *H04W 4/046* (2013.01); *H04W 48/14* (2013.01); *H04W 88/16* (2013.01)

(58) Field of Classification Search
CPC ..... H04W 48/17; H04W 48/14; H04W 48/08; H04W 48/20; H04W 4/046; H04W 88/16
See application file for complete search history.

(56) References Cited

U.S. PATENT DOCUMENTS

| | | | | |
|---|---|---|---|---|
| 6,154,658 | A * | 11/2000 | Caci ...................... | G08G 1/127 455/466 |
| 9,315,151 | B2 * | 4/2016 | Taylor ...................... | B60R 1/00 |
| 2014/0204906 | A1 * | 7/2014 | Sergeev ................ | H04W 36/18 370/331 |
| 2015/0057894 | A1 * | 2/2015 | Jung ................ | B60W 50/0098 701/49 |
| 2015/0325062 | A1 * | 11/2015 | Mason ................ | G07C 5/0816 701/29.3 |
| 2017/0250905 | A1 * | 8/2017 | Park ...................... | H04L 45/72 |
| 2018/0013569 | A1 * | 1/2018 | Knopf ..................... | H04L 9/088 |
| 2018/0096293 | A1 * | 4/2018 | Terwilliger ............ | H04W 4/70 |
| 2018/0178712 | A1 * | 6/2018 | Terwilliger ............ | B60Q 1/26 |
| 2018/0232959 | A1 * | 8/2018 | Thornburg ............ | G07C 5/008 |

* cited by examiner

*Primary Examiner* — Afsar M Qureshi
(74) *Attorney, Agent, or Firm* — Burbage Law, P.C.; Jon-Michael Burbage; Elizabeth Ruzich

(57) ABSTRACT

The disclosure includes embodiments for selecting one or more gateway vehicles for a virtual parked vehicle network including a plurality of parked vehicles that are members of the virtual parked vehicle network. A method according to some embodiments includes assigning position data to the plurality of parked vehicles which describes a plurality of unique position values for the plurality of parked vehicles in the virtual parked vehicle network. The method includes designating a parked vehicle having a lowest position value in the plurality of unique position values as a gateway vehicle for the virtual parked vehicle network. In some embodiments, the gateway vehicle is an only member of the virtual parked vehicle network that is operable to provide access to the virtual parked vehicle network.

20 Claims, 8 Drawing Sheets

GATEWAY SELECTION FOR A VIRTUAL PARKED VEHICLE NETWORK

BACKGROUND

The specification relates to gateway selection for a virtual parked vehicle network. The virtual parked vehicle network includes a cluster of parked vehicles.

Modern vehicles require regular access to wireless networks and updated sensor data describing their current environment. Accordingly, modern vehicles seek to access sensor data and other data provided by other vehicles or endpoints, or provide other vehicles and endpoints with updated sensor data and other data, on a regular basis. However, wireless networks and updated sensor data describing their current environment are not always available. Sometimes a wireless network is available, but the signal strength for the wireless network is too weak or variable, or the speed of the wireless network is too slow or unstable. These deficiencies are because the wireless networks are not optimized for mobility applications, or because they are transmitted from an access point which is too far from the roadway.

SUMMARY

A virtual parked vehicle network includes a plurality of parked vehicles that are wirelessly communicated to one another to form the virtual parked vehicle network. In this way, each of the plurality of parked vehicles is a member of the virtual parked vehicle network and can send and receive wireless communications with other members of the virtual parked vehicle network. Each of the plurality of parked vehicles includes an onboard unit that remains active while they are parked and members of the virtual parked vehicle network. The onboard unit includes, for example, a processor and a non-transitory memory.

In some embodiments, the non-transitory memories of the plurality of parked vehicles stores data for other endpoints that are not members of the virtual parked vehicle network (e.g., non-parked vehicles that are located within wireless communication range of the virtual parked vehicle network, which can be referred to herein as a "non-member endpoint" if referenced in the singular or "non-member endpoints" if referenced in the plural). This is an example of a service provided by the virtual parked vehicle network to non-member endpoints.

In some embodiments, the virtual parked vehicle network stores data for one or more non-parked vehicles that are not part of the virtual parked vehicle network using one or more non-transitory memories of the plurality of parked vehicles and the data is electronically transmissible via the gateway vehicle. In some embodiments, data is electronically transmissible if it is capable of being sent, received, accessed or retrieved via the gateway vehicle.

In some embodiments, the processors of the plurality of parked vehicles execute operations and process data for the non-member endpoints. This is another example of a service provided by the virtual parked vehicle network to non-member endpoints.

In some embodiments, a gateway vehicle is a parked vehicle that is a member of the virtual parked vehicle network which is operable to invite non-member endpoints to access the virtual parked vehicle network (e.g., to receive one or more services from the virtual parked vehicle network); parked vehicles which are members of the virtual parked vehicle network but not designated as a gateway vehicle are not operable to invite non-member endpoints to access the virtual parked vehicle network. In other words, being designated as a gateway vehicle includes modifying the operation of the vehicle which is designated as the gateway vehicle so that it can invite non-member endpoints to access the virtual parked vehicle network, and members which have not been designated as a gateway vehicle have not been similarly modified, and as a result of their lacking this necessary modification, they cannot invite non-member endpoints to access the virtual parked vehicle network.

A problem with the virtual parked vehicle network is that it includes a wireless communication channel for inviting non-member endpoints to access the virtual parked vehicle network and this channel becomes overloaded if each of the parked vehicles is allowed to act as a gateway vehicle for the virtual parked vehicle network. The gateway selection system described herein solves this problem by: (1) selecting which of the parked vehicles of the virtual parked vehicle network are designated as gateway vehicles; and (2) limiting the number of parked vehicles which are designated as gateway vehicles so that the overall number of invitations transmitted to non-member endpoints to access the virtual parked vehicle network is limited to a level which prevents the wireless communication channel for inviting non-member endpoints from becoming overloaded.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for selecting one or more gateway vehicles for a virtual parked vehicle network including a plurality of parked vehicles that are members of the virtual parked vehicle network, the method including: assigning position data to the plurality of parked vehicles which describes a plurality of unique position values for the plurality of parked vehicles in the virtual parked vehicle network; and designating a parked vehicle having a lowest position value in the plurality of unique position values as a gateway vehicle for the virtual parked vehicle network, where the gateway vehicle is an only member of the virtual parked vehicle network that is operable to provide access to the virtual parked vehicle network, the method is executed by a processor of the parked vehicle and the parked vehicle is assigned the lowest position value because it is executing the method. Other embodiments of this aspect include corresponding computer systems, apparatus, and computer programs recorded on one or more computer storage devices, each configured to perform the actions of the methods.

Implementations may include one or more of the following features. The method where the virtual parked vehicle network stores data for one or more non-parked vehicles that are not part of the virtual parked vehicle network using one or more non-transitory memories of the plurality of parked vehicles and the data is electronically transmissible via the gateway vehicle. In some embodiments, data is electronically transmissible if it is capable of being sent, received, accessed or retrieved via the gateway vehicle. The method where the virtual parked vehicle network processes data for one or more non-parked vehicles that are not part of the virtual parked vehicle network and the data is electronically transmissible via the gateway vehicle. The method where one or more other parked vehicles in the plurality that are not designated as the gateway vehicle are assigned their unique position values based on their real-world geographic position relative to a real-world geographic position of the parked vehicle that is designated as the gateway vehicle. The method further including one or more other parked vehicles transmitting global positioning system ("GPS") data describing their real-world geographic position to the parked vehicle that is designated as the gateway vehicle, where the one or more other parked vehicles include members of the virtual parked vehicle network that are not designated as the gateway vehicle. The method further including determining the plurality of unique position values based on the GPS data received from the one or more other parked vehicles and digital data describing the real-world geographic position of the parked vehicle that is designated as the gateway vehicle. The method further including: determining a number of hops in the virtual parked vehicle network relative to the parked vehicle designated as the gateway vehicle; retrieving threshold data describing a threshold for limiting a total number of gateway vehicles in the virtual parked vehicle network, where the threshold is a positive whole number n; and designating one or more parked vehicles in the plurality of parked vehicles that are n hops from the parked vehicle designated as the gateway vehicle as one or more additional gateway vehicles for the virtual parked vehicle network, where the gateway vehicle and the one or more additional gateway vehicles are the only members of the virtual parked vehicle network that are operable to provide access to the virtual parked vehicle network. Implementations of the described techniques may include hardware, a method or process, or computer software on a computer-accessible medium.

One general aspect includes a system for selecting one or more gateway vehicles for a virtual parked vehicle network including a plurality of parked vehicles that are members of the virtual parked vehicle network, the system including: an onboard unit of a parked vehicle including a non-transitory memory storing computer code which, when executed by the onboard unit causes the onboard unit to execute steps including: assigning position data to the plurality of parked vehicles which describes a plurality of unique position values for the plurality of parked vehicles, where the parked vehicle is assigned a lowest position value in the plurality of unique position values because the onboard unit of the parked vehicle is executing the steps; and designating the parked vehicle having the lowest position value in the plurality of unique position values as a gateway vehicle for the virtual parked vehicle network, where the gateway vehicle is an only member of the virtual parked vehicle network that is operable to provide access to the virtual parked vehicle network. Other embodiments of this aspect include corresponding computer systems, apparatus, and computer programs recorded on one or more computer storage devices, each configured to perform the actions of the methods.

Implementations may include one or more of the following features. The system where the virtual parked vehicle network stores data for one or more non-parked vehicles that are not part of the virtual parked vehicle network using one or more non-transitory memories of the plurality of parked vehicles and the data is electronically transmissible via the gateway vehicle. The system where the virtual parked vehicle network processes data for one or more non-parked vehicles that are not part of the virtual parked vehicle network and the data is electronically transmissible via the gateway vehicle. The system where one or more other parked vehicles in the plurality that are not designated as the gateway vehicle are assigned their unique position values based on their real-world geographic position relative to a real-world geographic position of the parked vehicle that is designated as the gateway vehicle. The system further including one or more other parked vehicles transmitting GPS data describing their real-world geographic position to the parked vehicle that is designated as the gateway vehicle, where the one or more other parked vehicles include members of the virtual parked vehicle network that are not designated as the gateway vehicle. The system where the steps further include determining the plurality of unique position values based on the GPS data received from the one or more other parked vehicles and digital data describing the real-world geographic position of the parked vehicle that is designated as the gateway vehicle. The system where the steps further include: determining a number of hops in the virtual parked vehicle network relative to the parked vehicle designated as the gateway vehicle; retrieving threshold data describing a threshold for limiting a total number of gateway vehicles in the virtual parked vehicle network, where the threshold is a positive whole number n; and designating one or more parked vehicles in the plurality of parked vehicles that are n hops from the parked vehicle designated as the gateway vehicle as one or more additional gateway vehicles for the virtual parked vehicle network, where the gateway vehicle and the one or more additional gateway vehicles are the only members of the virtual parked vehicle network that are operable to provide access to the virtual parked vehicle network. Implementations of the described techniques may include hardware, a method or process, or computer software on a computer-accessible medium.

One general aspect includes a method for selecting one or more gateway vehicles for a virtual parked vehicle network including a plurality of parked vehicles, the method including: receiving GPS data for the plurality of parked vehicles included in the virtual parked vehicle network; for each non-gateway vehicle included in the virtual parked vehicle network, determining their first average distance to all the other non-gateway vehicles in the virtual parked vehicle network based on the GPS data; and designating a non-gateway vehicle having a highest value for first average distance as a gateway vehicle for the virtual parked vehicle network, where the gateway vehicle is an only member of the virtual parked vehicle network that is operable to provide access to the virtual parked vehicle network for one or more other vehicles which are not members of the virtual parked vehicle network. Other embodiments of this aspect include corresponding computer systems, apparatus, and computer programs recorded on one or more computer storage devices, each configured to perform the actions of the methods.

Implementations may include one or more of the following features. The method where the first average distance for a particular non-gateway vehicle is a sum of its average distances to all the other non-gateway vehicles, as determined based on the GPS data, divided by a total number of non-gateway vehicles included in the virtual parked vehicle network. The method where the total number of non-gateway vehicles is determined based on unique instances of GPS data and the total number of non-gateway vehicles is decreased by one after the gateway vehicle is designated. The method further including: determining whether a threshold number of gateway vehicles is exceeded; responsive to the threshold number not being exceeded, determining, for each non-gateway vehicle included in the virtual parked vehicle network, a second average distance to the gateway vehicle; and designating the non-gateway vehicle having a highest value for the second average distance as an additional gateway vehicle for the virtual parked vehicle network, where the gateway vehicle and the additional gateway vehicle are the only members of the virtual parked vehicle network that are operable to provide access to the virtual parked vehicle network for the one or more other vehicles which are not members of the virtual parked vehicle network. The method where the threshold number is operable to limit a load for a designated channel used for inviting the one or more other vehicles which are not members of the virtual parked vehicle network to access the virtual parked vehicle network. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
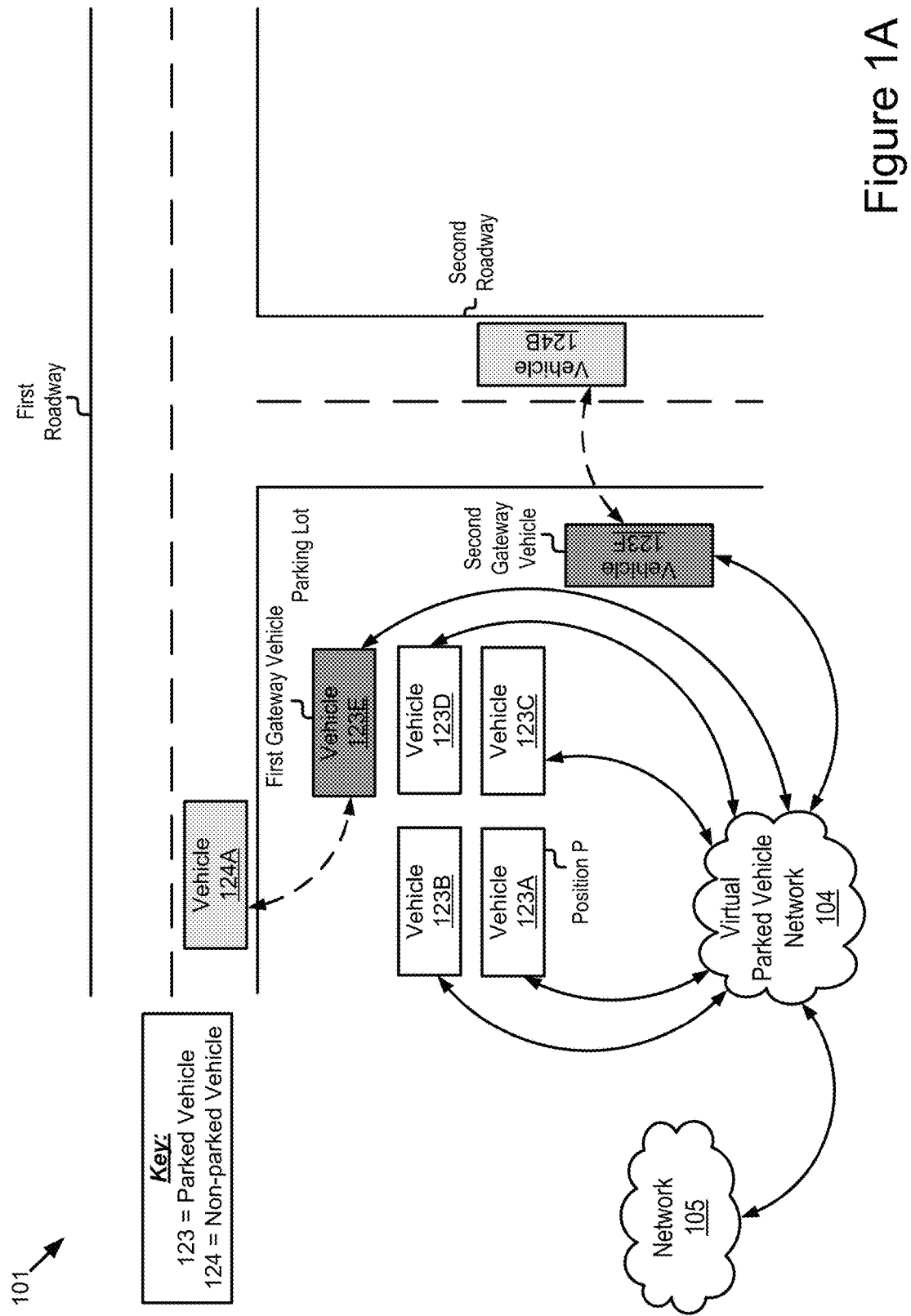
FIG. 1A is a block diagram illustrating an operating environment for a virtual parked vehicle network according to some embodiments.

Referring to FIG. 1A, depicted is an operating environment 100 for a gateway selection system of a virtual parked vehicle network 104 according to some embodiments.

The virtual parked vehicle network 104 is a wireless communication network formed by a plurality of parked vehicles which are each within wireless communication range of one another using a wireless communication protocol which is common to each of the plurality of parked vehicles and used to form the virtual parked vehicle network 104. The wireless communication protocol used to form the virtual parked vehicle network 104 is any form of wireless communication described below with reference to the network 105. For example, the wireless communication protocol used to form the virtual parked vehicle network 104 is Dedicated Short Range Communication ("DSRC") and each of the plurality of parked vehicles that are members of the virtual parked vehicle network 104 are DSRC-enabled vehicles which include any hardware or software necessary to comply with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

As depicted in FIG. 1A, the following vehicles are members of the virtual parked vehicle network 104: a first parked vehicle 123A; a second parked vehicle 123B; a third parked vehicle 123C; a fourth parked vehicle 123D; a fifth parked vehicle 123E; and a sixth parked vehicle 123F. This plurality of parked vehicles 123A, 123B, 123C, 123D, 123E, 123F can be referred to individually as the "vehicle 123" or the "parked vehicle 123," or collectively as the "vehicles 123" or the "plurality of parked vehicles 123." The plurality of parked vehicles 123 are each parked so long as they are members of the virtual parked vehicle network 104. The plurality of parked vehicles 123 individually include their own onboard unit which is powered on while they are members of the virtual parked vehicle network 104. See, for example, FIG. 1E.

In some embodiments, only connected vehicles can become members of the virtual parked vehicle network 104. In some embodiments, a connected vehicle is a vehicle that includes a communication unit 145 as described below with reference to FIG. 1E (or some component providing functionality which is similar to the communication unit 145).

Figure 1B:
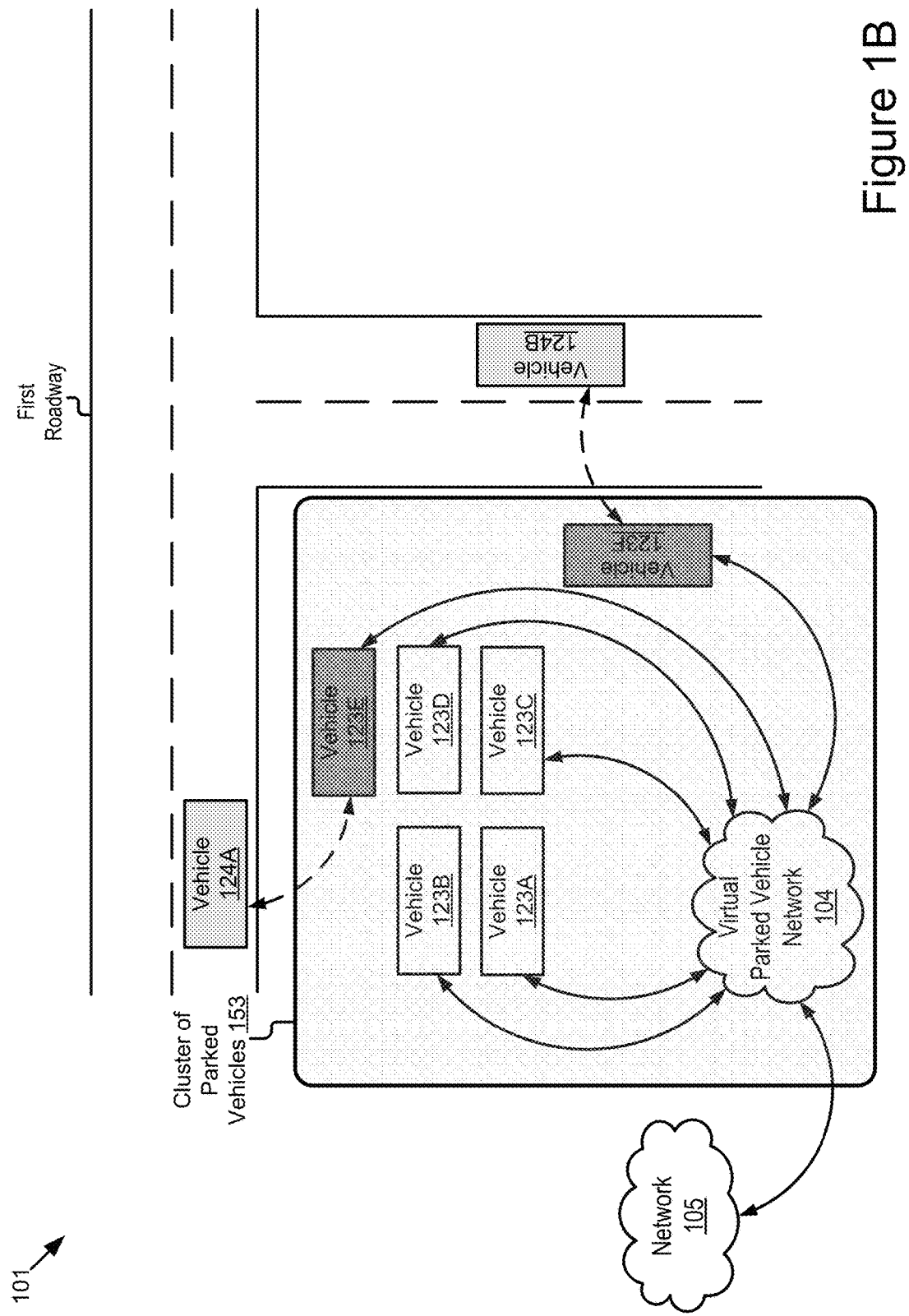
FIG. 1B is a block diagram illustrating a cluster of parked vehicles included in the operating environment according to some embodiments.
Figure 1C:
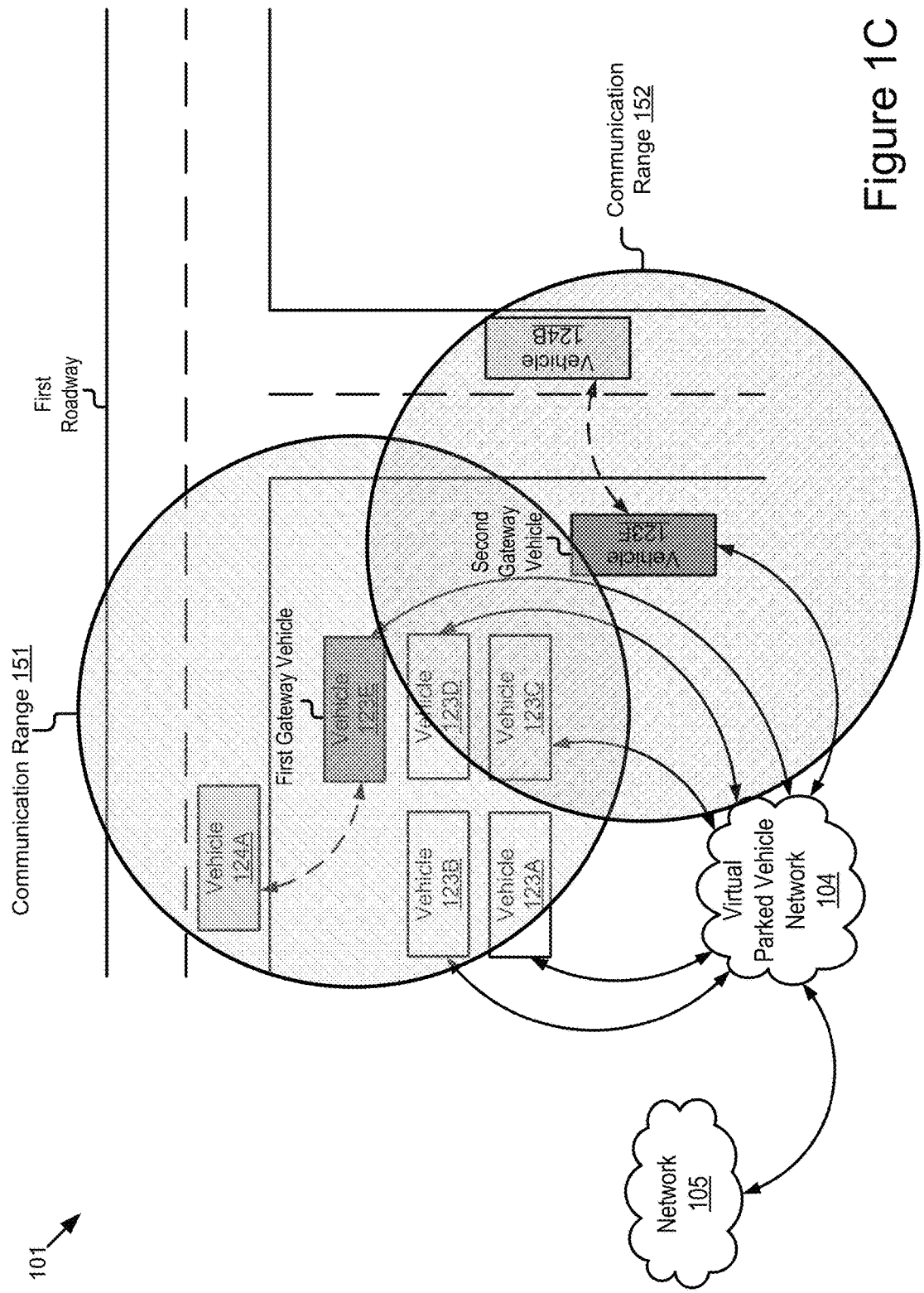
FIG. 1C is a block diagram illustrating communication ranges for a first gateway vehicle and second gateway vehicle of the virtual parked vehicle network included in the operating environment according to some embodiments.
Figure 1D:
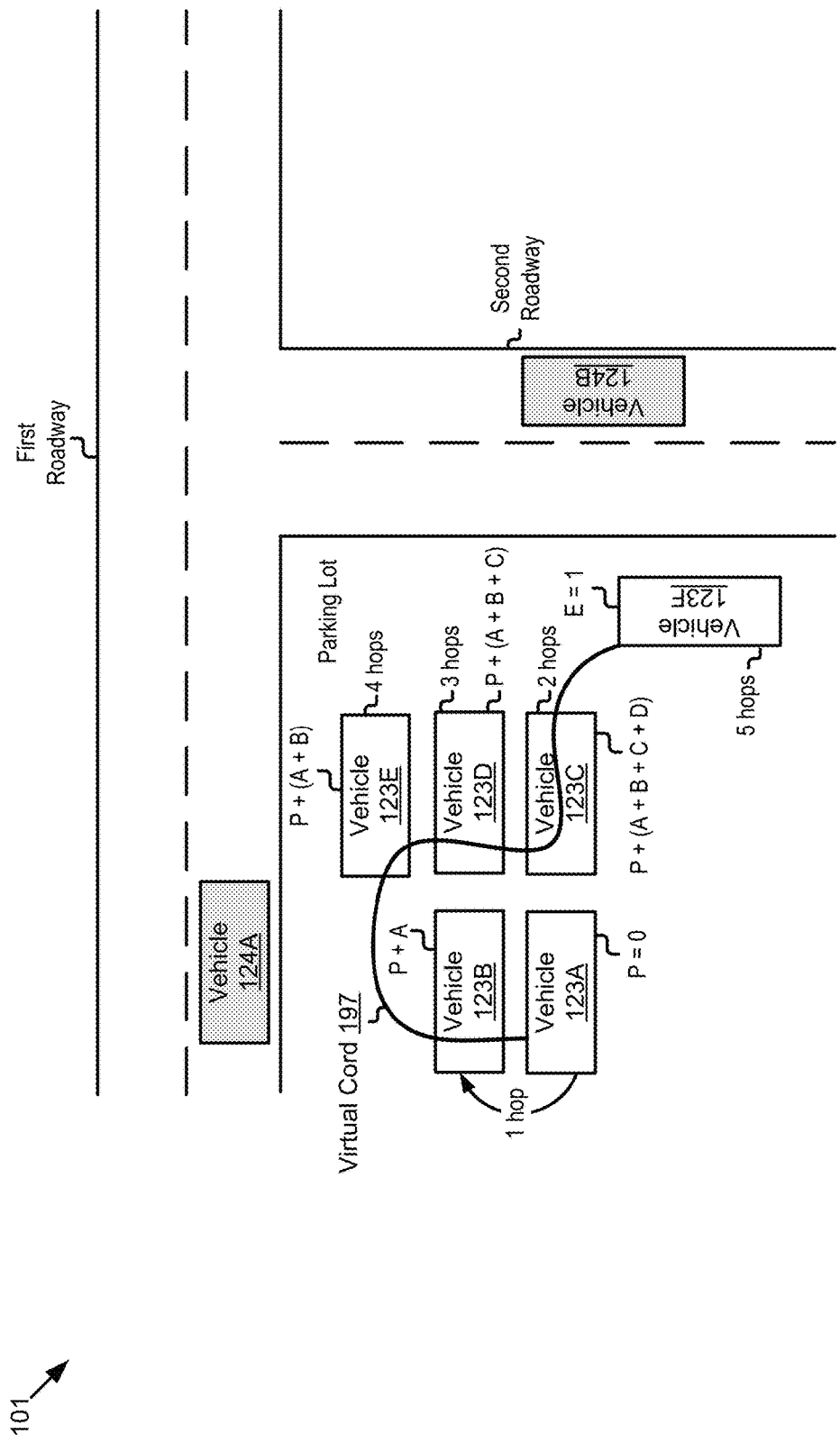
FIG. 1D is a block diagram illustrating a virtual cord included in the operating environment according to some embodiments.
Figure 1E:
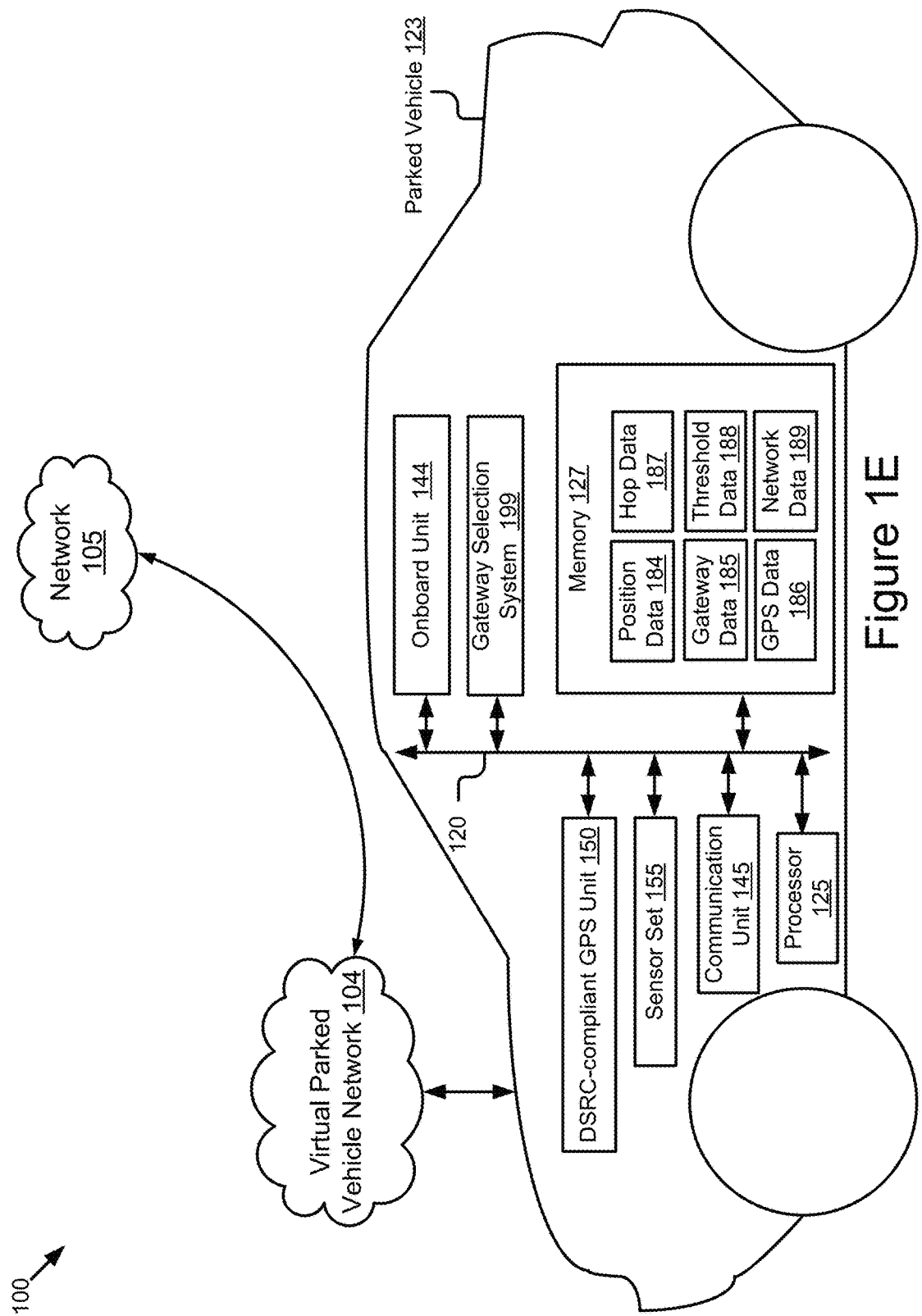
FIG. 1E is a block diagram illustrating an operating environment for a gateway selection system of a parked vehicle included in a virtual parked vehicle network according to some embodiments.
Figure 2:
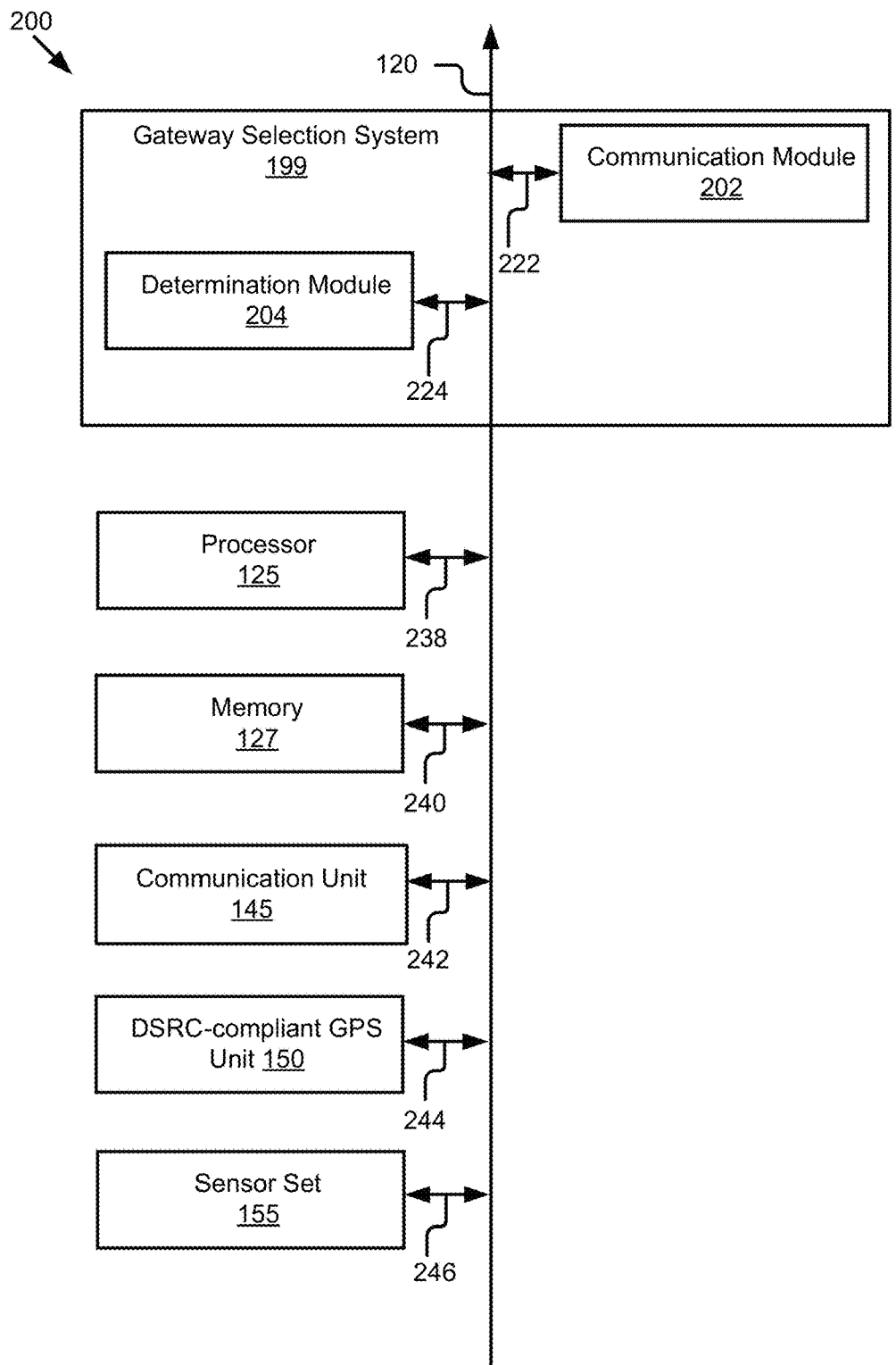
FIG. 2 is a block diagram illustrating an example computer system including the gateway selection system of a vehicle according to some embodiments.

In some embodiments, each of the plurality of parked vehicles 123 includes a gateway selection system 199 (see, e.g., FIGS. 1E and 2). In some embodiments, less than all of the plurality of parked vehicles 123 include the gateway selection system 199.

Although six parked vehicles 123 are depicted as members of the virtual parked vehicle network 104 in FIG. 1A, in practice the virtual parked vehicle network 104 can include any positive whole number of parked vehicles 123, including just one parked vehicle 123.

As depicted in FIG. 1A, the fifth parked vehicle 123E and the sixth parked vehicle 123F are designated by the gateway selection system 199 (which is, at a minimum, an element of one of the plurality of parked vehicles 123) as a first gateway vehicle and a second gateway vehicle, respectively. In some embodiments, a gateway vehicle is a parked vehicle that is a member of the virtual parked vehicle network 104 and is operable to invite non-member endpoints (e.g., the non-parked first vehicle 124A and the non-parked second vehicle 124B) to access the virtual parked vehicle network 104 (e.g., to receive one or more services from the virtual parked vehicle network 104). Parked vehicles 123 which are members of the virtual parked vehicle network 104 but not designated as a gateway vehicle (such as, in the depicted embodiment, the first parked vehicle 123A, the second parked vehicle 123B, the third parked vehicle 123C and the fourth parked vehicle 123D), are not operable to invite non-member endpoints to access the virtual parked vehicle network 104.

In some embodiments, being designated as a gateway vehicle includes the gateway selection system 199 modifying the operation of the parked vehicle 123 which is designated as the gateway vehicle so that it can invite non-member endpoints to access the virtual parked vehicle network 104, and members of the virtual parked vehicle network 104 which have not been designated as a gateway vehicle have not been similarly modified, and as a result, these unmodified members cannot invite non-member endpoints to access the virtual parked vehicle network 104.

In some embodiments, the first non-parked vehicle 124A and the second non-parked vehicle 124B are vehicles which are not parked and also not members of the virtual parked vehicle network 104. For example, the first non-parked vehicle 124A and the second non-parked vehicle 124B are traveling on roadways near a parking lot where the plurality of parked vehicles 123 are located. In some embodiments, the first non-parked vehicle 124A and the second non-parked vehicle 124B include a gateway selection system 199 and a communication unit (e.g., the communication unit 145 depicted in FIGS. 1E and 2) which enables them to wirelessly communicate with the virtual parked vehicle network 104.

A first example service provided by the virtual parked vehicle network 104 is now described. In some embodiments, the non-transitory memories of the plurality of parked vehicles 123 which are members of the virtual parked vehicle network 104 store data for other endpoints that are not members of the virtual parked vehicle network 104 (e.g., non-parked vehicles 124A, 124B) that are located within wireless communication range of the virtual parked vehicle network 104. An endpoint that is not a member of the virtual parked vehicle network 104 may be referred to herein as a "non-member endpoint" if referenced in the singular, or "non-member endpoints" if referenced in the plural.

A second example service provided by the virtual parked vehicle network 104 is now described. In some embodiments, the processors or onboard units of the plurality of parked vehicles 123, which are members of the virtual parked vehicle network 104, execute operations and process data for the non-member endpoints.

The plurality of parked vehicles 123 are each communicatively coupled to the virtual parked vehicle network 104. The virtual parked vehicle network 104 itself is optionally communicatively coupled to a network 105. For example, one or more of the parked vehicles 123 included in the plurality of parked vehicles 123 includes a communication unit 145 (as described below with reference to FIGS. 1E and 2) which enables the one or more parked vehicles 123 to provide the virtual parked vehicle network 104 with access to the network 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2X, LTE-D2D, VoLTE or any other mobile data network or combination of mobile data networks. Further, the network 105 may include one or more IEEE 802.11 wireless networks.

In some embodiments, one or more of the plurality of parked vehicles 123 and the non-member endpoints is a DSRC-equipped vehicle. The network 105 may include one or more communication channels shared among one or more of the plurality of parked vehicles 123 and the virtual parked vehicle network 104. The communication channel may include DSRC, LTE, LTE-D2D, mmWave, WiFi (infrastructure mode), WiFi (ad-hoc mode), visible light communication, TV white space communication, satellite communication, full-duplex wireless communication or any other wireless communication protocol such as those mentioned above.

The parked vehicles 123, the first non-parked vehicles 124A and the second non-parked vehicle 124B are any type of vehicle. For example, the parked vehicle 123 is one of the following types of vehicles: a car; a truck; a sports utility vehicle; a bus; a semi-truck; a drone or any other roadway-based conveyance.

In some embodiments, one or more of the parked vehicles 123, the first non-parked vehicles 124A and the second non-parked vehicle 124B are an autonomous vehicle or a semi-autonomous vehicle. For example, the first non-parked vehicle 124A includes a set of Advanced Driver Assistance Systems (a set of "ADAS systems") which provide autonomous features to the first non-parked vehicle 124A which are sufficient to render the first non-parked vehicle 124A an autonomous vehicle.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. The different levels of autonomous vehicles are described briefly below.

Level 0: The set of ADAS systems installed in a vehicle have no vehicle control, but may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the autonomous vehicle fail to respond properly (based on the driver's subjective judgement). The set of ADAS systems installed in the autonomous vehicle executes accelerating, braking, and steering. The set of ADAS systems installed in the autonomous vehicle can deactivate immediately upon takeover by the driver.

Level 3: Within known, limited environments (such as freeways), the driver can safely turn their attention away from driving tasks, but must still be prepared to take control of the autonomous vehicle when needed.

Level 4: The set of ADAS systems installed in the autonomous vehicle can control the autonomous vehicle in all but a few environments such as severe weather. The driver must enable the automated system (which is comprised of the set of ADAS systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle ("HAV") is an autonomous vehicle that is Level 3 or higher.

Accordingly, in some embodiments the parked vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

Referring now to FIG. 1B, depicted is a block diagram illustrating a cluster 153 of parked vehicles 123 included in the operating environment 101 according to some embodiments. The cluster 153 includes the plurality of parked vehicles 123 that are members of the virtual parked vehicle network 104. In some embodiments, the area of the cluster 153 is a function of the range of the wireless communication protocol used among the plurality of parked vehicles 123 to form the virtual parked vehicle network 104 and the nearest parked vehicle in the parking lot that is eligible to be a member of the virtual parked vehicle network 104 but outside of the range of the wireless communication protocol used to form the virtual parked vehicle network 104. For example, if DSRC is used to form the virtual parked vehicle network 104, and the range of DSRC is about 500 meters, then a parked vehicle in the parking lot which his otherwise eligible but greater than 500 meters from the nearest parked vehicle 123 that is a member of the virtual parked vehicle network 104 would contribute to limiting the total area of the cluster 153.

Referring now to FIG. 1C, depicted is a block diagram illustrating communication ranges for a first gateway vehicle (which, in the depicted embodiment, is the fifth parked vehicle 123E, and as such, will be referred to as the first gateway vehicle 123E when described with reference to FIG. 1C) and a second gateway vehicle (which, in the depicted embodiment, is the sixth parked vehicle 123F, and as such, will be referred to as the second gateway vehicle 123F when described with reference to FIG. 1C) of the virtual parked vehicle network 104 included in the operating environment 101 according to some embodiments.

In the depicted embodiment, the first non-parked vehicle 124A is within a first communication range 151 of the first gateway vehicle 123E. Accordingly, the first gateway vehicle 123E can transmit an invitation to the first non-parked vehicle 124A to access one or more services provided by the virtual parked vehicle network 104. The dotted line joining the first non-parked vehicle 124A and the first gateway vehicle 123E in FIG. 1C represents a wireless communication including the invitation and a wireless communication including a response to the invitation. Note, however, that the second parked vehicle 123B cannot transmit an invitation to the first non-parked vehicle 124A because the second parked vehicle 123B is not designated as a gateway vehicle of the virtual parked vehicle network 104 in the depicted embodiment. For example, only vehicles designated as a gateway vehicle have been modified by the gateway selection system 199, depicted in FIGS. 1E and 2, to include the computer code which is necessary to generate or transmit such an invitation.

In the depicted embodiment, the second non-parked vehicle 124B is within a second communication range 152 of the second gateway vehicle 123F. Accordingly, the second gateway vehicle 123F can transmit an invitation to the second non-parked vehicle 124B to access one or more services provided by the virtual parked vehicle network 104. Note, however, that the third parked vehicle 123C cannot transmit an invitation to the second non-parked vehicle 124B because the third parked vehicle 123C is not designated as a gateway vehicle of the virtual parked vehicle network 104 in the depicted embodiment. The dotted line joining the second non-parked vehicle 124B and the second gateway vehicle 123F in FIG. 1C represents a wireless communication including the invitation and a wireless communication including a response to the invitation.

Referring now to FIG. 1D, depicted is a block diagram illustrating a virtual cord 197 included in the operating environment 101 according to some embodiments. Note in FIG. 1D that the fifth parked vehicle 123E and the sixth parked vehicle 123F are not depicted with a shaded block because in some embodiments described with reference to FIG. 1D these parked vehicles are not designated as gateway vehicles.

In some embodiments the virtual cord 197 organizes how one or more of the parked vehicles 123 included in the virtual parked vehicle network 104 are selected to be gateway vehicles for the virtual parked vehicle network 104. For example, the virtual cord 197 includes each of the plurality of parked vehicles 123 included in the virtual parked vehicle network 104, and defines their position within the virtual parked vehicle network 104. The position for each of the plurality of parked vehicles 123 is described by position data 184, which is depicted in FIG. 1E.

In the depicted embodiment, a first end of the virtual cord 197 is the first parked vehicle 123A, which is assigned a position value, P, equal to 0 within the virtual cord 197; this is a lowest position value within the virtual cord 197. In some embodiments, the first parked vehicle 123A is designated as a gateway vehicle because it is assigned the lowest position value.

The second end of the virtual cord is the sixth parked vehicle 123F, which his assigned a position value, E, equal to 1 within the virtual cord 197; this is a highest position value within the virtual cord 197. All other assigned position values for the plurality of vehicles 123 are between 0 and 1. The second parked vehicle 123B is assigned position value equal to P+A where P=0 and A is a positive real number which is greater than 0 and less than 1. The second parked vehicle 123B is one hop from the first parked vehicle 123A, which may be the gateway vehicle as described in the preceding paragraph. The third parked vehicle 123C is assigned position value equal to P+(A+B) where P=0 and B is a positive real number which is greater than 0 and less than 1, and the sum of P+A+B is less than 1. The third parked vehicle 123C is two hops from the first parked vehicle 123A. The fourth parked vehicle 123D is assigned position value equal to P+(A+B+C) where P=0 and C is a positive real number which is greater than 0 and less than 1, and the sum of P+A+B+C is less than 1. The fourth parked vehicle 123D is three hops from the first parked vehicle 123A. The fifth parked vehicle 123E is assigned position value equal to P+(A+B+C+D) where P=0 and D is a positive real number which is greater than 0 and less than 1, and the sum of P+A+B+C+D is less than 1. The fifth parked vehicle 123E is four hops from the first parked vehicle 123A. The sixth parked vehicle 123F is assigned position value equal to 1 because it is the second end of the virtual cord 197. The sixth parked vehicle 123F is five hops from the first parked vehicle 123A.

In some embodiments, a threshold limits a total number of gateway vehicles in the virtual parked vehicle network 104, where the threshold is a positive whole number n and is described by threshold data 188 which is depicted in FIG. 1E. The gateway selection system 199 of the gateway vehicle, which is the first parked vehicle 123A in the depicted embodiment, designates one or more parked vehicles 123 in the virtual cord 197 that are n hops from the parked vehicle designated as the gateway vehicle as one or more additional gateway vehicles for the virtual parked vehicle network 104, where the gateway vehicle and the one or more additional gateway vehicles are the only members of the virtual parked vehicle network 104 that are operable to provide access to the virtual parked vehicle network 104 (e.g., via an invitation).

Referring now to FIG. 1E, depicted is a block diagram illustrating an operating environment 100 for a gateway selection system 199 of a parked vehicle 123 included in a virtual parked vehicle network 104 according to some embodiments.

In some embodiments, the parked vehicle 123 includes one or more of the following elements: a processor 125; a memory 127; a communication unit 145; a DSRC-compliant GPS unit 150; a sensor set 155; an onboard unit 144; and a gateway selection system 199. These elements of the parked vehicle 123 are communicatively coupled to one another via a bus 120.

In some embodiments, the processor 125 and the memory 127 may be elements of an onboard vehicle computer system (such as computer system 200 described below with reference to FIG. 2). The onboard vehicle computer system may be operable to cause or control the operation of the gateway selection system 199. The onboard vehicle computer system may be operable to access and execute the data stored on the memory 127 to provide the functionality described herein for the gateway selection system 199 or its elements (see, e.g., FIG. 2). The onboard vehicle computer system may be operable to execute the gateway selection system 199 which causes the onboard vehicle computer system to execute one or more of the steps of the method 300 described below with reference to FIGS. 3A and 3B.

In some embodiments, the processor 125 and the memory 127 may be elements of onboard unit 144. The onboard unit 144 includes an electronic control unit (herein "ECU") or an onboard vehicle computer system that may be operable to cause or control the operation of the gateway selection system 199. The onboard unit 144 may be operable to access and execute the data stored on the memory 127 to provide the functionality described herein for the gateway selection system 199 or its elements. The onboard unit 144 may be operable to execute the gateway selection system 199 which causes the onboard unit 144 to execute one or more of the steps of the method 300 described below with reference to FIGS. 3A and 3B. In some embodiments, the computer system 200 depicted in FIG. 2 is an example of an onboard unit 144.

In some embodiments, the DSRC-compliant GPS unit 150 includes any hardware and software necessary to make the parked vehicle 123 or the DSRC-compliant GPS unit 150 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 150 is operable to provide GPS data 186 describing the location of vehicle 123 with space-level accuracy. For example, the parked vehicle 123 is parked in a parking space of a parking lot. Space-level accuracy means that the location of the parked vehicle 123 is described by the GPS data 186 so accurately that the parked vehicle's 123 parking space within the parking lot may be accurately determined based on the GPS data 186 for this parked vehicle 123. In the context of the gateway selection system 199, space-level accuracy enables the gateway selection system 199 to more accurately determine whether a particular parked vehicle 123 is a gateway vehicle (see, e.g., FIG. 4) as determined based on the GPS data for each of the parked vehicles within the virtual parked vehicle network 104. Space-level accuracy means that the geographic position of the parked vehicle 123 is described by the GPS data 186 with an accuracy of plus or minus 1.5 meters relative to an actual geographic position of the parked vehicle 123 in the real-world.

In some embodiments, the DSRC-compliant GPS unit 150 includes hardware that wirelessly communicates with a GPS satellite to retrieve GPS data 186 that describes the geographic location of the parked vehicle 123 with a precision that is compliant with the DSRC standard. The DSRC standard requires that GPS data 186 be precise enough to infer if two vehicles (one of which is, for example, the parked vehicle 123) are located in adjacent parking spaces. In some embodiments, the DSRC-compliant GPS unit 150 is operable to identify, monitor and track its two-dimensional position within 1.5 meters of its actual position 68% of the time under an open sky. Since parking spaces are typically no less than 3 meters wide, whenever the two-dimensional error of the GPS data 186 is less than 1.5 meters the gateway selection system 199 described herein may analyze the GPS data 186 provided by the DSRC-compliant GPS unit 150 and determine what parking space the parked vehicle 123 is parked in based on the relative positions of two or more different parked vehicles (one of which is, for example, the parked vehicle 123) in a parking lot at the same time.

By comparison to the DSRC-compliant GPS unit 150, a conventional GPS unit which is not compliant with the DSRC standard is unable to determine the location of a vehicle 123 with space-level accuracy. For example, a typical parking space is approximately 3 meters wide. However, a conventional GPS unit only has an accuracy of plus or minus 10 meters relative to the actual location of the parked vehicle 123. As a result, such conventional GPS units are not sufficiently accurate for use by the gateway selection system 199 in some embodiments since they would not enable the gateway selection system 199 to accurately identify average distances as described below with reference to FIG. 4.

The sensor set 155 may include one or more sensors that are operable to measure the physical environment outside of the parked vehicle 123. For example, the sensor set 155 may include one or more sensors that record one or more physical characteristics of the physical environment that is proximate to the parked vehicle 123. The memory 127 may store sensor data that describes the one or more physical characteristics recorded by the sensor set 155. The sensor data may be used by the gateway selection system 199 to confirm or deny the GPS data 186 or other data stored in the memory 127. For example, the GPS data 186 may indicate that the parked vehicle 123 is located near a particular landmark, and the sensor data may include an image that includes the particular landmark, thereby confirming the accuracy of the GPS data 186.

In some embodiments, the sensor set 155 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The parked vehicle 123 may include one or more processors 125. Other processors, operating systems, sensors, displays, and physical configurations may be possible.

The memory 127 is a non-transitory memory that stores instructions or data that may accessed and executed by the processor 125. The instructions or data may include code for performing the techniques described herein. The memory 127 may be a dynamic random access memory (DRAM) device, a static random access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random access memory (virtual RAM). The parked vehicle 123 may include one or more memories 127.

The memory 127 of the parked vehicle 123 stores one or more of the following types of digital data: position data 184; gateway data 185; GPS data 186; hop data 187; threshold data 188; and network data 189.

The position data 184 is digital data that describes a plurality of unique position values for each of the plurality of parked vehicles 123 included in the virtual parked vehicle network 104. In some embodiments, the parked vehicle 123 including the gateway selection system 199 which assigns the position data 184 to the plurality of parked vehicles 123 is assigned a lowed assigned position value (e.g., 0). In some embodiments, the lowed assigned position value for any given virtual parked vehicle network 104 is always 0 and a highest assigned position value for any given virtual parked vehicle network 104 is always 1, with any other parked vehicles 123 being assigned a position value between 0 and 1. In some embodiments, the position data 184 is assigned based on the GPS data 186 for the plurality of parked vehicles 123.

The gateway data 185 is digital data that describe which of the parked vehicles 123 included in the plurality of parked vehicles 123 included in the virtual parked vehicle network 104 is designated as a gateway vehicle. The gateway data 185 may also include the first distance data and the second distance data described below with reference to FIG. 4.

The GPS data 186 is digital data that describes one or more of the following: (1) a location of the parked vehicle 123; and (2) a current time for the parked vehicle 123. In some embodiments, the GPS data 186 describes the location of the vehicle with space-level precision. For example, the GPS data 186 is received from the DSRC-compliant GPS unit 150 and describes the current location of the parked vehicle 123 with such precision that the location of the parked vehicle 123 within a particular parking space of a parking lot is identifiable based on the GPS data 186.

In some embodiments, each of the plurality of parked vehicles 123 transmits or broadcasts a DSRC message to the other parked vehicles 123 included in the plurality, and this DSRC message includes the GPS data 186 for the parked vehicle 123 which transmits or broadcasts this DSRC message. This transmission or broadcast may occur at regular intervals. For example, the DSRC message is a Basic Safety Message ("BSM message") which includes the GPS data 186 and is transmitted at regular intervals as specified by the DSRC standard.

The hop data 187 is digital data that describes one or more of the following: (1) a number of hops in the virtual parked vehicle network 104; (2) for each parked vehicle 123 included in the virtual parked vehicle network 104, the number of hops separating it from parked vehicle 123 having the lowest position value as described by the position data 184; and (3) for each parked vehicle 123 included in the virtual parked vehicle network 104, the number of hops separating it from one or more gateway vehicles for the virtual parked vehicle network 104.

The threshold data 188 is digital data that describes a threshold for limiting the total number of gateway vehicles in the virtual parked vehicle network 104. In some embodiments, the threshold is a value n and the value is a positive whole number which is less than the total number of parked vehicles 123 included in the virtual parked vehicle network 104. In some embodiments, the threshold described by the threshold data 188 is operable to prevent a channel which is used to send invitations to access the virtual parked vehicle network 104 from becoming overloaded due to wireless messages including invitations. In some embodiments, the threshold may be updated based on measured load for this channel, such that some gateway vehicles may have their designation as a gateway vehicle revoked.

The network data 189 is digital data that identifies each of the parked vehicles 123 included in the virtual parked vehicle network 104 at any given time and any information about these parked vehicles that is included in the DSRC messages or BSM messages that they transmit or broadcast.

The communication unit 145 transmits and receives data to and from a virtual parked vehicle network 104, a network 105 or to another communication channel. For example, the communication unit 145 includes any hardware or software necessary to enable the communication unit 145 to send and receive wireless messages via one or more of the following interface types (herein referred to as the "plurality of different interface types"); DSRC; LTE; LTE-D2D; mmWave; WiFi (infrastructure mode); WiFi (ad-hoc mode); visible light communication; TV white space communication; and satellite communication.

In some embodiments, if the communication unit 145 is an element of a parked vehicle 123 that is not designated as a gateway vehicle, then the communication unit 145 is configured or made operable so that the communication unit 145 is unable to transmit invitations using a channel that is reserved for sending invitations.

In some embodiments, the communication unit 145 includes a DSRC transceiver, a DSRC receiver and other hardware or software necessary to make the parked vehicle 123 (and, optionally, one or more of the first non-parked vehicle 124A and the second non-parked vehicle 124B) a DSRC-enabled device such as a DSRC-enabled vehicle.

In some embodiments, the communication unit 145 includes a port for direct physical connection to the network 105 or to another communication channel. For example, the communication unit 145 includes a universal serial bus (USB), secure digital (SD), CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The onboard unit 144 is a vehicular processor-based computing device. For example, the onboard unit 144 is an onboard vehicle computer system or an ECU of the parked vehicle 123. In some embodiments, the onboard unit 144 is a special-purpose computing device which is operable to execute the gateway selection system 199. In some embodiments, the gateway selection system is an element of the onboard unit 144.

In some embodiments, the gateway selection system 199 includes code and routines that are operable, when executed by the processor 125, to cause the processor 125 to execute one or more of the steps of the method 300 described below with reference to FIG. 3 or the method 400 described below with reference to FIG. 4.

In some embodiments, the gateway selection system 199 of the parked vehicle 123 may be implemented using hardware including a field-programmable gate array ("FPGA") or an application-specific integrated circuit ("ASIC"). In some other embodiments, the gateway selection system 199 may be implemented using a combination of hardware and software. The gateway selection system 199 may be stored in a combination of the devices (e.g., servers or other devices) or parked vehicles 123.

Figure 3:
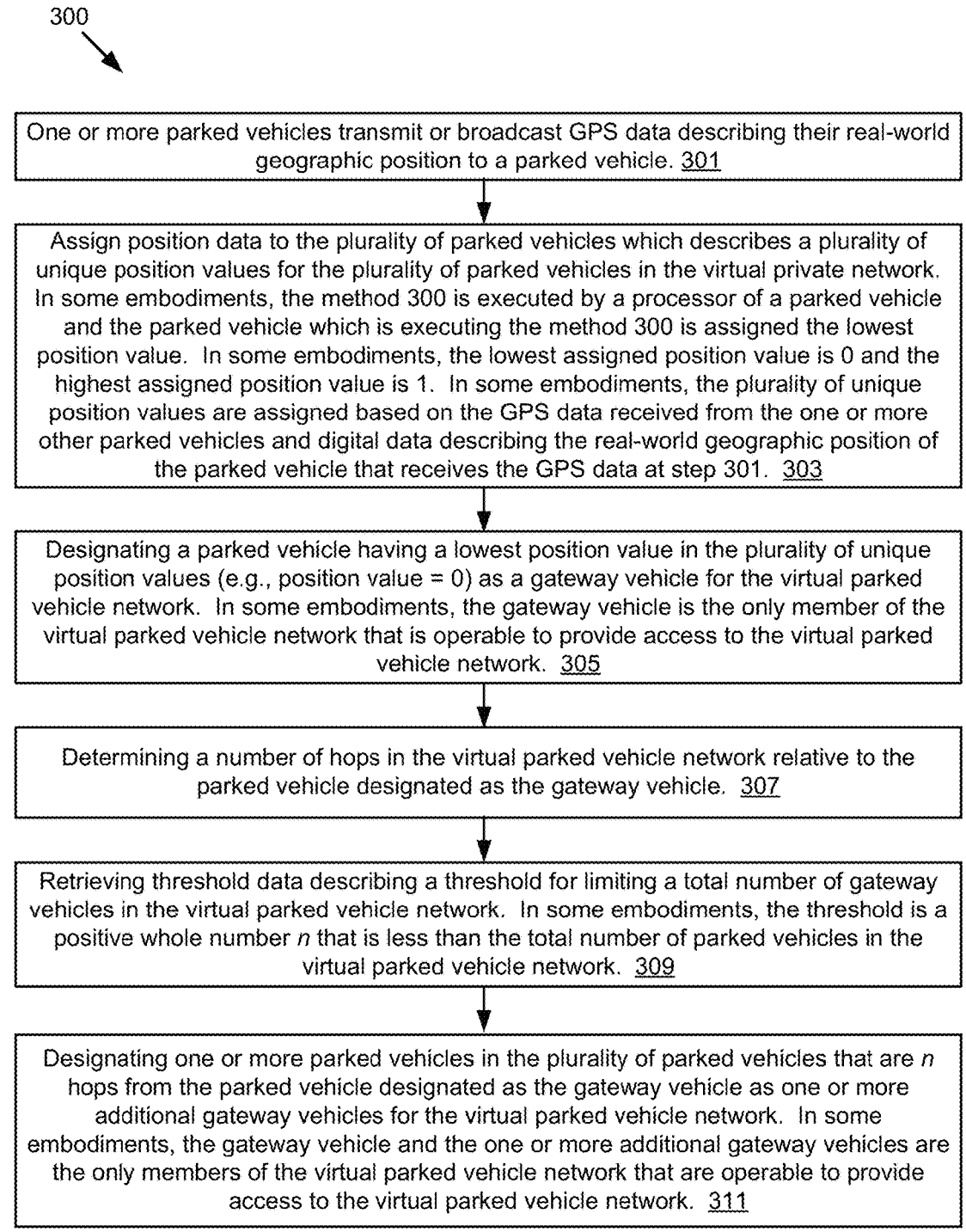
FIG. 3 is an example flow diagram of a method for selecting one or more gateway vehicles for the virtual parked vehicle network based on position data for the members of the virtual parked vehicle network, according to some embodiments.
Figure 4:
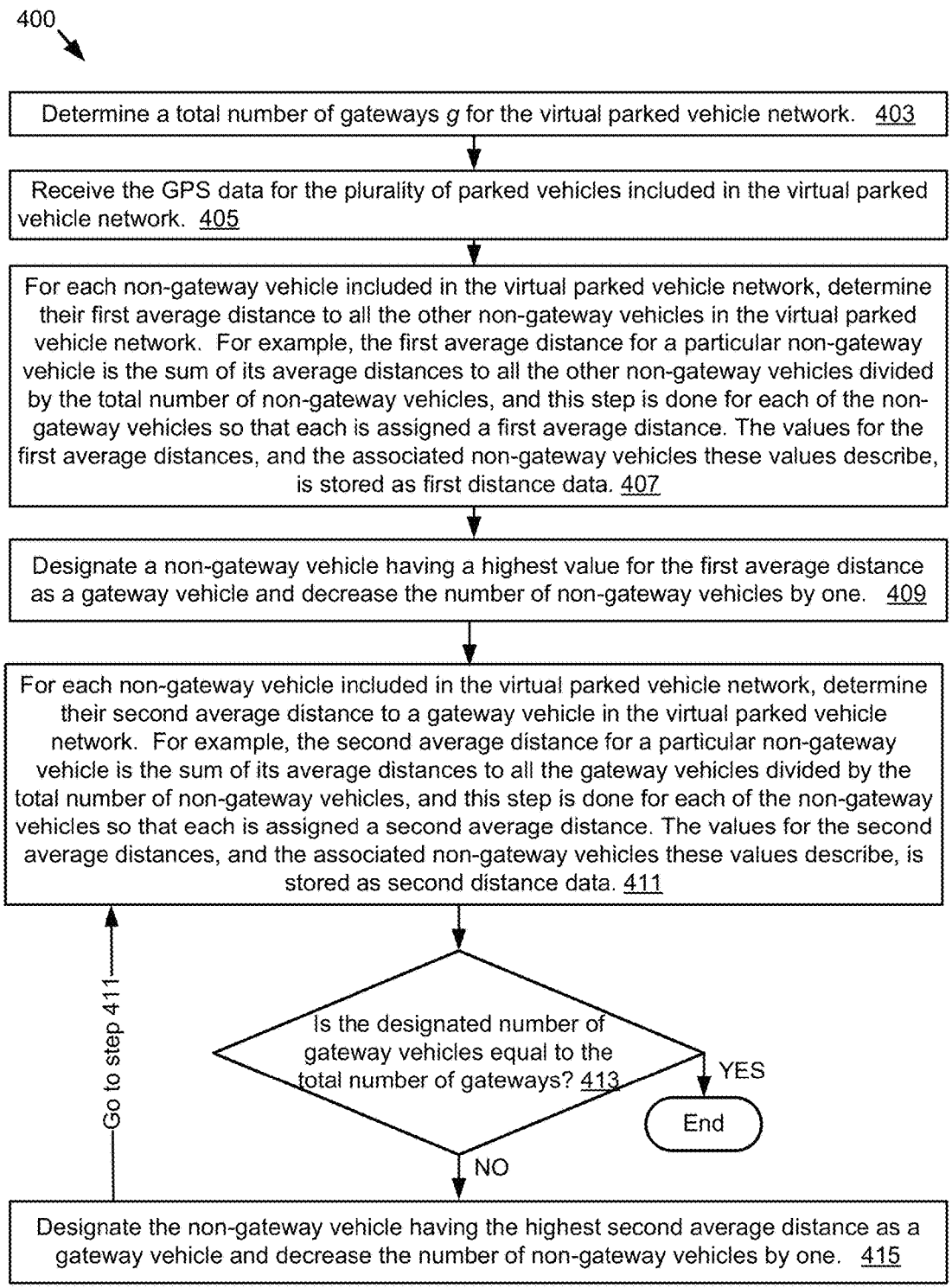
FIG. 4 is an example flow diagram of a method for selecting one or more gateway vehicles for the virtual parked vehicle network based on GPS data for the members of the virtual parked vehicle network, according to some embodiments.

The gateway selection system 199 is described in more detail FIGS. 2, 3 and 4.

Example Computer System

Referring now to FIG. 2, depicted is a block diagram illustrating an example computer system 200 including a gateway selection system 199 according to some embodiments.

In some embodiments, the computer system 200 may include a special-purpose computer system that is programmed to perform one or more steps of a method 300 described below with reference to FIG. 3.

In some embodiments, the computer system 200 may include a special-purpose computer system that is programmed to perform one or more steps of a method 400 described below with reference to FIG. 4.

In some embodiments, the computer system 200 is an onboard vehicle computer of the parked vehicle 123. In some embodiments, the computer system 200 is an onboard unit 144 of the parked vehicle 123. In some embodiments, the computer system 200 is an ECU, head unit or some other processor-based computing device of the parked vehicle 123.

The computer system 200 may include one or more of the following elements according to some examples: the gateway selection system 199; the processor 125; the memory 127; the communication unit 145; the DSRC-compliant GPS unit 150; and the sensor set 155. The components of the computer system 200 are communicatively coupled by a bus 120.

In the illustrated embodiment, the processor 125 is communicatively coupled to the bus 120 via a signal line 238. The memory 127 is communicatively coupled to the bus 120 via a signal line 240. The communication unit 145 is communicatively coupled to the bus 120 via a signal line 242. The DSRC-compliant GPS unit 150 is communicatively coupled to the bus 120 via a signal line 244. The sensor set 155 are communicatively coupled to the bus 120 via a signal line 246.

The following elements of the computer system 200 were described above with reference to FIGS. 1A-1E, and so, those descriptions will not be repeated here: the processor 125; the memory 127; the communication unit 145; the DSRC-compliant GPS unit 150; and the sensor set 155.

The memory 127 may store any of the data described above with reference to FIGS. 1A-1E. The memory 127 may store any data needed for the computer system 200 to provide its functionality.

In the illustrated embodiment shown in FIG. 2, the gateway selection system 199 includes a communication module 202 and a determination module 204.

The communication module 202 can be software including routines for handling communications between the gateway selection system 199 and other components of the computer system 200 or one or more of the operating environments 100, 101. In some embodiments, the communication module 202 can be a set of instructions executable by the processor 125 to provide the functionality described below for handling communications between the gateway selection system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 receives or transmits, via the communication unit 145, one or more types of digital data stored on the memory 127. The communication module 202 may send or receive any of the data or messages described above with reference to FIGS. 1A-1E, or below with reference to FIGS. 3 and 4, via the communication unit 145.

In some embodiments, the communication module 202 receives data from components of the gateway selection system 199 and stores the data in the memory 127 (or a buffer or cache of the memory 127). For example, the communication module 202 receives any of the data described above with reference to the memory 127 from the communication unit 145 (via the virtual parked vehicle network 104 or the network 105) and stores this data in the memory 127 (or a buffer or cache of the memory 127).

In some embodiments, the communication module 202 may handle communications between components of the gateway selection system 199. For example, the communication module 202 may transmit GPS data 186 to the determination module 204.

The determination module 204 can be software including routines for selecting one or more of the parked vehicles included in a virtual parked vehicle network 104 to designate as gateway vehicles and then causing the communication unit 145 to transmit digital data to the one or more designated gateway vehicles which configures these one or more parked vehicles 123 to operate as gateway vehicles. In some embodiments, the determination module 204 can be a set of instructions executable by the processor 125 which, when executed by the processor 125, cause the processor 125 to execute one or more of the steps described below with reference to FIGS. 3 and 4.

In some embodiments, the determination module 204 can be stored in the memory 127 of the computer system 200 and can be accessible and executable by the processor 125. The determination module 204 may be adapted for cooperation and communication with the processor 125 and other components of the computer system 200 via signal line 224.

Example Methods

Referring now to FIG. 3, depicted is an method 300 for selecting one or more gateway vehicles for the virtual parked vehicle network based on position data for the members of the virtual parked vehicle network, according to some embodiments.

One or more of the steps described herein for the method 300 may be executed by one or more computer systems 200.

At step 301, one or more parked vehicles transmit or broadcast GPS data describing their real-world geographic position to a parked vehicle. The GPS data may be transmitted or broadcast via a DSRC message (e.g., a BSM message). A particular parked vehicle receives the wireless message that includes the GPS data. In some embodiments, this particular parked vehicle includes a gateway selection system 199 that executes the steps of the method 300.

At step 303, position data is assigned to the plurality of parked vehicles which describes a plurality of unique position values for the plurality of parked vehicles in the virtual parked vehicle network. In some embodiments, the method 300 is executed by a processor of a parked vehicle and the parked vehicle which is executing the method 300 is assigned the lowest position value. In some embodiments, the lowest assigned position value is 0 and the highest assigned position value is 1. In some embodiments, the plurality of unique position values are assigned based on the GPS data received from the one or more other parked vehicles and digital data describing the real-world geographic position of the parked vehicle that receives the GPS data at step 301.

At step 305, a parked vehicle having a lowest position value in the plurality of unique position values (e.g., position value=0) is designated as a gateway vehicle for the virtual parked vehicle network. In some embodiments, the gateway vehicle is the only member of the virtual parked vehicle network that is operable to provide access to the virtual parked vehicle network.

At step 307, a number of hops in the virtual parked vehicle network relative to the parked vehicle designated as the gateway vehicle is determined. This number is stored as hop data.

At step 309, threshold data describing a threshold for limiting a total number of gateway vehicles in the virtual parked vehicle network is retrieved. In some embodiments, the threshold is a positive whole number n that is less than the total number of parked vehicles in the virtual parked vehicle network.

At step 311, one or more parked vehicles in the plurality of parked vehicles that are n hops from the parked vehicle designated as the gateway vehicle are designated as one or more additional gateway vehicles for the virtual parked vehicle network. In some embodiments, the gateway vehicle and the one or more additional gateway vehicles are the only members of the virtual parked vehicle network that are operable to provide access to the virtual parked vehicle network.

Referring now to FIG. 4, depicted is an example flow diagram of a method 400 for selecting one or more gateway vehicles for the virtual parked vehicle network based on GPS data for the members of the virtual parked vehicle network, according to some embodiments.

One or more of the steps described herein for the method 400 may be executed by one or more computer systems 200.

At step 403, a total number of gateways g for the virtual parked vehicle network is determined.

At step 405, GPS data for the plurality of parked vehicles included in the virtual parked vehicle network is received.

At step 407, for each non-gateway vehicle included in the virtual parked vehicle network, their first average distance to all the other non-gateway vehicles in the virtual parked vehicle network is determined. For example, the first average distance for a particular non-gateway vehicle is the sum of its average distances to all the other non-gateway vehicles divided by the total number of non-gateway vehicles, and this step is done for each of the non-gateway vehicles so that each is assigned a value for their first average distance. The values for the first average distances, and the associated non-gateway vehicles these values describe, is stored as first distance data.

At step 409, a non-gateway vehicle having a highest value for the first average distance is designated as a gateway vehicle and the number of non-gateway vehicles is decreased by one.

At step 411, for each non-gateway vehicle included in the virtual parked vehicle network, their second average distance to a gateway vehicle in the virtual parked vehicle network is determined. For example, the second average distance for a particular non-gateway vehicle is the sum of its average distances to all the gateway vehicles divided by the total number of non-gateway vehicles, and this step 411 is done for each of the non-gateway vehicles so that each is assigned a value for their second average distance. The values for the second average distances, and the associated non-gateway vehicles these values describe, is stored as second distance data.

At step 413, a determination is made regarding whether designated number of gateway vehicles for the virtual parked vehicle network is equal to the total number of gateway vehicles from step 403. If the determination is positive, then the method 400 ends. If the determination is negative, then the method proceeds to step 415.

At step 415, the non-gateway vehicle included in the virtual parked vehicle network having a highest second average distance is designated as a gateway vehicle. Also at step 415, the total number of non-gateway vehicles is decreased by one. The method 400 then returns to step 411.

In some embodiments, the digital data describing placement is determined based on a virtual cord protocol, which is known to those having skill in the art.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for selecting one or more gateway vehicles for a virtual parked vehicle network including a plurality of parked vehicles that are members of the virtual parked vehicle network, the method comprising:
   assigning position data to the plurality of parked vehicles which describes a plurality of unique position values for the plurality of parked vehicles in the virtual parked vehicle network; and
   designating a parked vehicle having a lowest position value in the plurality of unique position values as a gateway vehicle for the virtual parked vehicle network, wherein the gateway vehicle is an only member of the virtual parked vehicle network that is operable to provide access to the virtual parked vehicle network, the method is executed by a processor of the parked vehicle and the parked vehicle is assigned the lowest position value because it is executing the method.

2. The method of claim 1, wherein the virtual parked vehicle network stores data for one or more non-parked vehicles that are not part of the virtual parked vehicle network using one or more non-transitory memories of the plurality of parked vehicles and the data is electronically transmissible via the gateway vehicle.

3. The method of claim 1, wherein the virtual parked vehicle network processes data for one or more non-parked vehicles that are not part of the virtual parked vehicle network and the data is electronically transmissible via the gateway vehicle.

4. The method of claim 1, wherein one or more other parked vehicles in the plurality that are not designated as the gateway vehicle are assigned their unique position values based on their real-world geographic position relative to a real-world geographic position of the parked vehicle that is designated as the gateway vehicle.

5. The method of claim 1, further comprising one or more other parked vehicles transmitting global positioning system data (GPS data) describing their real-world geographic position to the parked vehicle that is designated as the gateway vehicle, wherein the one or more other parked vehicles include members of the virtual parked vehicle network that are not designated as the gateway vehicle.

6. The method of claim 5, further comprising determining the plurality of unique position values based on the GPS data received from the one or more other parked vehicles and digital data describing the real-world geographic position of the parked vehicle that is designated as the gateway vehicle.

7. The method of claim 1, further comprising:
   determining a number of hops in the virtual parked vehicle network relative to the parked vehicle designated as the gateway vehicle;
   retrieving threshold data describing a threshold for limiting a total number of gateway vehicles in the virtual parked vehicle network, wherein the threshold is a positive whole number n; and
   designating one or more parked vehicles in the plurality of parked vehicles that are n hops from the parked vehicle designated as the gateway vehicle as one or more additional gateway vehicles for the virtual parked vehicle network, wherein the gateway vehicle and the one or more additional gateway vehicles are the only members of the virtual parked vehicle network that are operable to provide access to the virtual parked vehicle network.

8. A system for selecting one or more gateway vehicles for a virtual parked vehicle network including a plurality of parked vehicles that are members of the virtual parked vehicle network, the system comprising:
   an onboard unit of a parked vehicle including a non-transitory memory storing computer code which, when executed by the onboard unit causes the onboard unit to execute steps comprising:
   assigning position data to the plurality of parked vehicles which describes a plurality of unique position values for the plurality of parked vehicles, wherein the parked vehicle is assigned a lowest position value in the plurality of unique position values because the onboard unit of the parked vehicle is executing the steps; and designating the parked vehicle having the lowest position value in the plurality of unique position values as a gateway vehicle for the virtual parked vehicle network, wherein the gateway vehicle is an only member of the virtual parked vehicle network that is operable to provide access to the virtual parked vehicle network.

9. The system of claim 8, wherein the virtual parked vehicle network stores data for one or more non-parked vehicles that are not part of the virtual parked vehicle network using one or more non-transitory memories of the plurality of parked vehicles and the data is electronically transmissible via the gateway vehicle.

10. The system of claim 8, wherein the virtual parked vehicle network processes data for one or more non-parked vehicles that are not part of the virtual parked vehicle network and the data is electronically transmissible via the gateway vehicle.

11. The system of claim 8, wherein one or more other parked vehicles in the plurality that are not designated as the gateway vehicle are assigned their unique position values based on their real-world geographic position relative to a real-world geographic position of the parked vehicle that is designated as the gateway vehicle.

12. The system of claim 8, further comprising one or more other parked vehicles transmitting global positioning system data (GPS data) describing their real-world geographic position to the parked vehicle that is designated as the gateway vehicle, wherein the one or more other parked vehicles include members of the virtual parked vehicle network that are not designated as the gateway vehicle.

13. The system of claim 12, wherein the steps further comprise determining the plurality of unique position values based on the GPS data received from the one or more other parked vehicles and digital data describing the real-world geographic position of the parked vehicle that is designated as the gateway vehicle.

14. The system of claim 8, wherein the steps further comprise:
determining a number of hops in the virtual parked vehicle network relative to the parked vehicle designated as the gateway vehicle;
retrieving threshold data describing a threshold for limiting a total number of gateway vehicles in the virtual parked vehicle network, wherein the threshold is a positive whole number n; and
designating one or more parked vehicles in the plurality of parked vehicles that are n hops from the parked vehicle designated as the gateway vehicle as one or more additional gateway vehicles for the virtual parked vehicle network, wherein the gateway vehicle and the one or more additional gateway vehicles are the only members of the virtual parked vehicle network that are operable to provide access to the virtual parked vehicle network.

15. The system of claim 14, wherein the gateway vehicle transmits a wireless message including an invitation to access the virtual parked vehicle network.

16. A method for selecting one or more gateway vehicles for a virtual parked vehicle network including a plurality of parked vehicles, the method comprising:
receiving global positioning system data (GPS data) for the plurality of parked vehicles included in the virtual parked vehicle network;
for each non-gateway vehicle included in the virtual parked vehicle network, determining their first average distance to all the other non-gateway vehicles in the virtual parked vehicle network based on the GPS data; and
designating a non-gateway vehicle having a highest value for first average distance as a gateway vehicle for the virtual parked vehicle network, wherein the gateway vehicle is an only member of the virtual parked vehicle network that is operable to provide access to the virtual parked vehicle network for one or more other vehicles which are not members of the virtual parked vehicle network.

17. The method of claim 16, wherein the first average distance for a particular non-gateway vehicle is a sum of its average distances to all the other non-gateway vehicles, as determined based on the GPS data, divided by a total number of non-gateway vehicles included in the virtual parked vehicle network.

18. The method of claim 17, wherein the total number of non-gateway vehicles is determined based on unique instances of GPS data and the total number of non-gateway vehicles is decreased by one after the gateway vehicle is designated.

19. The method of claim 18, further comprising:
determining whether a threshold number of gateway vehicles is exceeded;
responsive to the threshold number not being exceeded, determining, for each non-gateway vehicle included in the virtual parked vehicle network, a second average distance to the gateway vehicle; and
designating the non-gateway vehicle having a highest value for the second average distance as an additional gateway vehicle for the virtual parked vehicle network, wherein the gateway vehicle and the additional gateway vehicle are the only members of the virtual parked vehicle network that are operable to provide access to the virtual parked vehicle network for the one or more other vehicles which are not members of the virtual parked vehicle network.

20. The method of claim 19, wherein the threshold number is operable to limit a load for a designated channel used for inviting the one or more other vehicles which are not members of the virtual parked vehicle network to access the virtual parked vehicle network.

* * * * *